UNITED STATES PATENT OFFICE.

WALTER KROPP AND LUDWIG TAUB, OF ELBERFELD, GERMANY, ASSIGNORS TO FARBENFABRIKEN VORM. FRIEDR. BAYER & CO., OF ELBERFELD, GERMANY, A CORPORATION OF GERMANY.

DERIVATIVE OF PHENYLALKYLACETIC ACID.

996,096.  Specification of Letters Patent.  Patented June 27, 1911.

No Drawing.  Application filed March 20, 1911.  Serial No. 615,649.

*To all whom it may concern:*

Be it known that we, WALTER KROPP and LUDWIG TAUB, doctors of philosophy, chemists, citizens of the German Empire, residing at Elberfeld, Germany, have invented new and useful Improvements in New Derivatives of Phenylalkylacetic Acids, of which the following is a specification.

Our invention relates to the manufacture and production of new valuable pharmaceutical products which are chemically the amid compounds of phenyl-alkyl-acetic acids of the formula:

$$C_2H_5-CY-CO.NH.X$$
$$|$$
$$C_6H_5$$

(X stands for hydrogen which may be replaced by $-CO.NH_2$, Y stands for hydrogen which may be replaced by alkyl) and which according to our researches are valuable sedatives and hypnotics which also possess antipyretic properties.

The new products are crystalline compounds soluble in hot alcohol and hot benzene. When reacted upon by hot alkalis they are split up into the phenyl-alkyl-acetic acid and ammonia or urea.

In carrying out our process practically we can proceed as follows, the parts being by weight: 492 parts of phenyl-ethyl-acetic acid are heated to 100° C. with 140 parts of $PCl_3$, the product of the reaction is separated from the phosphoric acid and the chlorid is distilled *in vacuo*. The chlorid of phenyl-ethyl-acetic acid is then treated with an excess of ammonia, the amid is filtered off and crystallized from benzene. It is a white crystalline powder melting at 86° C., soluble in hot alcohol and hot benzene; liberating the acid when reacted upon by caustic alkali and exhibiting valuable therapeutic especially sedative properties; an average dose being from ½ to 1 gram. The reaction proceeds in accordance with the following equations:

(1) $3C_2H_5-CH.COOH+PCl_3=3C_2H_5-CH.COCl+P\begin{pmatrix}OH\\OH\\OH\end{pmatrix}$
$\quad\quad\quad |\quad\quad\quad\quad\quad\quad\quad\quad |$
$\quad\quad\quad C_6H_5\quad\quad\quad\quad\quad\quad\quad C_6H_5$ (2) $C_2H_5-CH.CO\ Cl+NH_3=C_2H_5-CH.CO.NH_2+HCl$
$\quad\quad |\quad\quad\quad\quad\quad\quad\quad\quad\quad |$
$\quad\quad C_6H_5\quad\quad\quad\quad\quad\quad\quad\quad C_6H_5$ The urea compound melts at 147° C. The amid of phenyl-diethyl-acetic acid melts at 54° C., its ureid at 132–133° C.

We claim:—

1. The herein described amid compounds of phenyl-alkyl-acetic acid of the above given formula; being crystalline compounds, soluble in hot alcohol and hot benzene; liberating the acids when reacted upon by caustic alkali, exhibiting valuable therapeutic especially sedative properties, substantially as described.

2. The herein described new amid of phenyl-ethyl-acetic acid being a white crystalline compound melting at 86° C., soluble in hot alcohol and hot benzene; liberating the acid when reacted upon by caustic alkali; exhibiting valuable therapeutic especially sedative properties, substantially as described.

In testimony whereof we have hereunto set our hands in the presence of two subscribing witnesses.

WALTER KROPP. [L. S.]
LUDWIG TAUB. [L. S.]

Witnesses:
CHAS. J. WRIGHT,
ALFRED HENKEL.